Nov. 25, 1941.        F. J. GAVIN ET AL        2,263,693
METHOD OF AND APPARATUS FOR MAKING SPOT CROWNS
Filed Sept. 9, 1938
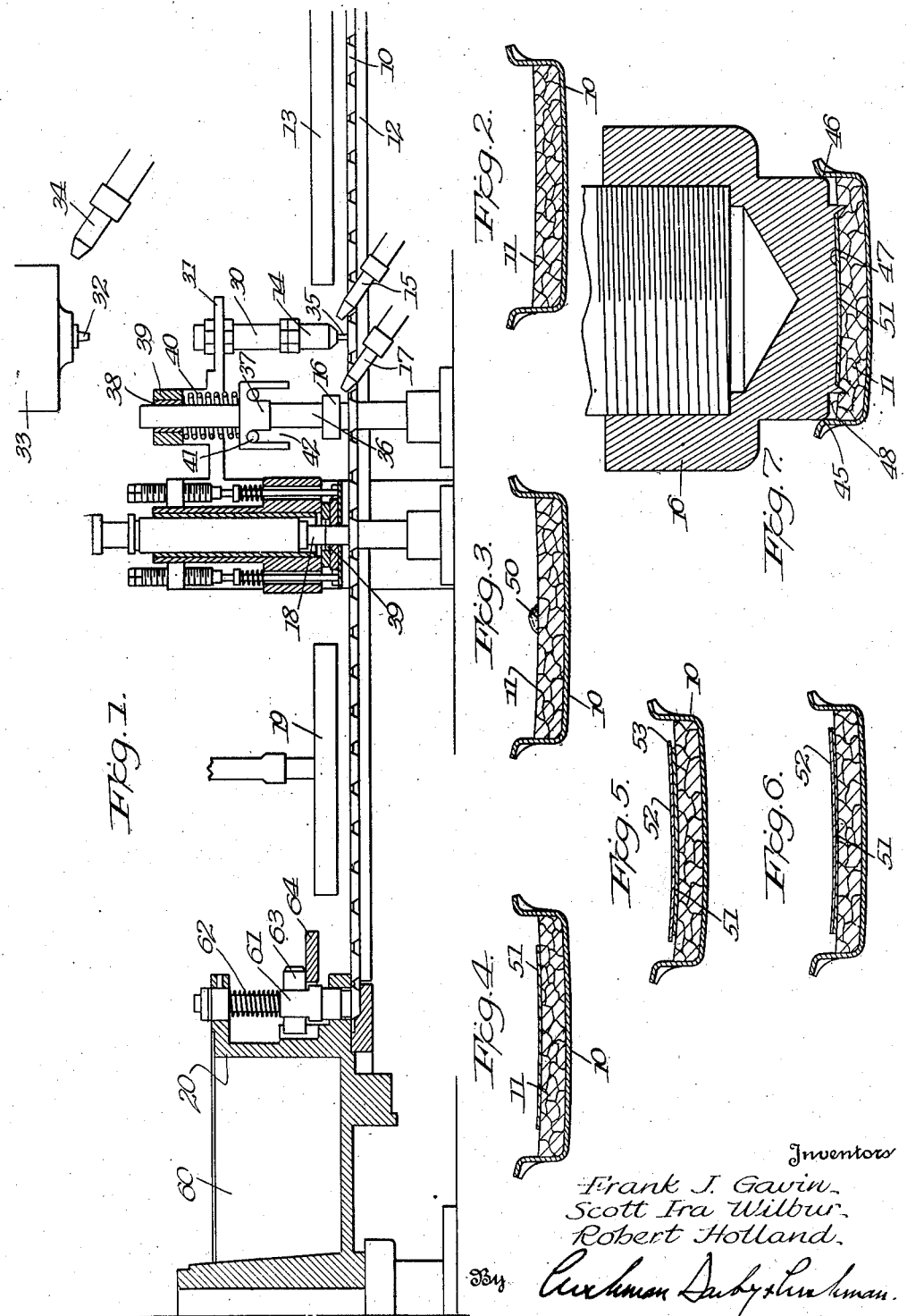
Inventors
Frank J. Gavin,
Scott Ira Wilbur,
Robert Holland.
By Cushman Darby & Cushman
Attorneys

UNITED STATES PATENT OFFICE 2,263,693

METHOD OF AND APPARATUS FOR MAKING SPOT CROWNS

Frank J. Gavin, Scott Ira Wilbur, and Robert Holland, Baltimore, Md., assignors to Crown Cork & Seal Company, Inc., Baltimore, Md., a corporation of New York Application September 9, 1938, Serial No. 229,190

13 Claims. (Cl. 113—80)

The present invention relates to a method of and apparatus for producing spot crowns. More particularly, the invention provides a new method and means for securing spot liners to the cushion discs of previously assembled crown closures.

It is a primary object of the invention to simplify and to cheapen the operation of securing spot liners to crown closures. The method accomplishes all of the advantages of prior commercial developments and can be used with standard assembly lines with only slight changes and without reducing the speed of operation or diminishing the certainty of result.

According to standard practice in the art, the sheet material which is used to form spot liners is coated on one surface with a layer of thermoplastic adhesive. The discs or spots are punched from strips of the sheet material and, by the operation of the cutting punch, are secured immediately to the cushion discs of the crown closures by the simultaneous application of heat and pressure. After being initially put in place by the punch, the liners are usually firmly bonded to the cushions by a further application of heat and pressure. The skeleton strip from which the spots are cut, of course, consists of a composite, laminated sheet, including a substantial amount of thermoplastic adhesive. This skeleton strip is either waste material or can be re-claimed only by separating the adhesive from the main body, at considerable expense.

In accordance with the present invention, uncoated spotting material, having no adhesive layer associated therewith, is secured to the cushion discs of the crown closures. This is accomplished by first applying to the cushion discs a layer of thermoplastic adhesive, so that, as the uncoated spots are punched from the strip and deposited on the cushion layers, they adhere immediately to the thermoplastic adhesive previously positioned thereon and rendered tacky by the application of heat. The spots so positioned on the cushions are preferably subjected to further heat and pressure to firmly secure them in position.

The invention also includes novel means and methods of applying a layer of thermoplastic adhesive centrally over a predetermined portion of the surface of the cushion, in concentric relation to the edges thereof. To this end, a novel form of spreading punch or press is preferably employed.

The step of applying the spot to the layer of thermoplastic adhesive on the face of the cushion may follow immediately after the layer of adhesive has been deposited and spread accurately on the cushion, or the layer of adhesive may be permitted to cool and harden between the time of its application to the cushion and the deposit of the spot thereon. In other words, the cushions may first be provided with layers of thermoplastic adhesive and then be stored until such time as it may be desired to complete their fabrication. In such a case it is simply necessary to preheat the closures and the adhesive in the spotting machine, in order to render the adhesive layer tacky so as to receive the desired spot material. On the other hand, if a continuous operation is desired, the spot material may be applied substantially immediately after the spreading of the adhesive on the cushion.

The adhesive which is preferably used with the method of the present invention is a thermoplastic composition of resins, waxes and/or gums, heated sufficiently to have the necessary fluidity, without the addition of solvents, although in some cases, a thermoplastic adhesive in a solvent solution may be employed. The adhesive should have a melting point of around 128° to 130° F. It must set rapidly after application to the cushion of the crown closure to produce a non-tacky film at room temperatures.

If the spots are subsequently applied, considerably after the application of the adhesive layer, the adhesive must be of such composition that, when its surface is heated, it will become sufficiently tacky to hold the metal or paper spots directly in the center of the cushion so that no off-centers are produced when the crowns are moved along the rack or guide rails of the machine prior to entering the final pressure applying mechanism.

As stated above, it is preferred to use an adhesive having no solvent associated therewith, but satisfactory results have been accomplished by using the same adhesive now conventionally employed with coated spotting material, such as nitro-cellulose-resin thermoplastic cement which is usually applied in solution to one side of aluminum foil and dried in an oven to expel the solvents. If such an adhesive is used, the coated crown closure must be subjected to a heat treatment after the spreading operation has been completed and before the spots are applied, in order to drive off the solvent.

Preferably, however, an adhesive containing no solvents and no nitro-cellulose is employed. In addition to synthetic resins, the adhesive preferably contains a wax or other non-tacky substance in order to give a "dry" or non-tacky feel to the adhesive when set at room temperatures, but without interfering with the adhesive properties. Such waxes as ceresin wax, or the Du Pont product "Opal Wax" may be employed, or ethyl cellulose, benzyl cellulose or the like. Such resins as Rezyl and Arachlor may be mixed in substantially equal quantities to form the major portion of the adhesive. The two resins are melted together to a liquid of fairly thin viscosity which solidifies on cooling to a sticky gummy mass having thermoplastic properties, and may be remelted without sacrifice of its adhesive or thermoplastic properties. A suitable formula is given by way of example, as follows:

|  | Grams |
|---|---|
| #19 Rezyl resin (American Cyanamid Co.) | 10 |
| #4465 Arachlor resin (Swann Chemical Co.) | 10 |
| Ceresin wax | 2½ |

At room temperatures this adhesive has a dry, waxy feel, but when subjected to heat and pressure, as in bonding aluminum foil or laminated paper spots to cork cushions in a spotting machine, it has remarkable adhesive properties and affords an excellent bonding medium.

In the accompanying drawing, the method of the present invention is diagrammatically illustrated and a diagrammatic apparatus lay-out is shown, but it must be understood that the invention is not limited to the specific details of construction shown, nor to the particular sequence of method steps.

In the drawing:

Figure 1 is a diagrammatic vertical sectional view of an apparatus for performing the method of the invention.

Figure 2 is a sectional view of a crown closure having a cushion liner secured therein.

Figure 3 is a similar view after the small body of adhesive has been deposited.

Figure 4 is a similar view showing the closure after the next step in the method has been performed.

Figure 5 is a similar view showing the spot deposited on the adhesive.

Figure 6 is a similar view showing the completed article, and

Figure 7 is a vertical sectional view of a preferred form of adhesive spreader.

Crown closures comprising metal shells 10 and cushion liners 11 may be fed from a storage receptacle and mechanical hopper down a chute to a feed dial, not shown. A suitable rack conveyor moves the crowns along a platform 12, by a step by step movement, from right to left as viewed in Figure 1. The mechanism for moving the crowns in this manner is not shown in detail, since it forms no part of the invention claimed in the present application. A conveying mechanism such as is shown in the patent to Johnson 1,852,578, granted April 5, 1932, may be employed.

As the crowns enter the spotting machine, they pass under a preheater 13 and the temperature of the cork cushions is raised to prevent freezing of the thermoplastic adhesive when deposited thereon. The heating means associated with the preheater 13 preferably is a gas burner.

After leaving the preheater, the crowns are conveyed to a position beneath the adhesive applying mechanism 14, which may be heated by a gas jet 15. Next, the crowns come to rest under the adhesive spreader 16, which may be heated by another gas burner 17. The spots are punched from a strip by a punch 18 and simultaneously deposited upon the layer of adhesive previously spread upon the cushion liners by the spreader 16. Next, the crowns with the spots slightly secured therein, preferably pass beneath a gas heated post heater 19. Finally, the heated crowns are received in the pressure dial 20, where they are subjected to sufficient pressure to firmly bond the spots to the cushion liners.

The means for depositing the adhesive centrally of the cushion liners may be substantially the same as the adhesive applying device shown in the patent to McManus 1,444,515, issued February 6, 1923. Such a mechanism may comprise a tube 30 adjustably mounted in a vertically reciprocable arm 31 carried by the mechanism which operates the punch 18. The upper end of the tube is open and is positioned directly beneath the outlet 32 of an adhesive receptacle 33 which is heated by a gas burner 34 or the like. The receptacle 33 is provided with a valve controlled outlet so that the drop by drop flow of adhesive from the receptacle to the tube may be accurately controlled to correspond to the deposit of adhesive in the crowns.

The lower end of the tube 30 carries a relatively movable needle valve 35 which controls the deposit of adhesive in the caps. By adjusting the position of the tube 30, the length of the stroke of the valve stem 35 may be varied, thereby varying the amount of adhesive applied to each closure. As stated above, the details of construction of a suitable adhesive applicator are disclosed in the patent to McManus 1,444,515.

The spreader 16 also is carried by the arm 31 which reciprocates vertically with the spotting material punch 18. The spreader is mounted at the lower end of a vertical post or plunger 36 having a bracket 37 secured thereon. The post extends upwardly through a bushing 38 secured in a boss 39 integral with the arm 31 whereby sliding movement between the post and arm is permitted. A compression spring 40, disposed between the boss 39 and the bracket 37, urges the plunger downwardly. Pins 41, associated with the arm 31, are disposed in downwardly opening channels 42, on the undersurface of the bracket 37, so that, on upward movement of the arm 31, the bracket 37 and the post 36 are raised to lift the spreader 16 out of the crown closure.

As shown in Figure 7, the spreader is provided with a peripheral shoulder 45 adapted to engage the skirt of the crown shell for centering purposes. Below the shoulder the end face of the spreader 16 is provided with a concavity, formed by a downwardly projecting, annular flange 46, extending beyond the spreading surface 47 of the tool. The flange 46 acts as an abutment wall to limit the lateral spreading movement of the adhesive, under the influence of pressure applied thereto by the surface 47. The edge of the flange 46 is relatively sharp and embeds itself into the cushion liner, forming therewith a tight seal to limit the outward flow of the adhesive. The flange is concentric with the outer margin of the cushion liner, whereby the adhesive is spread over a central portion of the cushion, forming a circular coating arranged in concentric relation to the cushion and leaving an annular uncoated portion 48 along the margin of the cushion.

Preferably, the diameter of the coating so applied is less than the diameter of the spot to be positioned thereon, as hereafter explained.

The punch 18 serves to cut out circular discs of uncoated spotting material, such as aluminum foil or varnished paper, from an elongated strip fed with a step by step movement through a slot 49 beneath the punch. The punch not only cuts out the discs, but carries them down and deposits them on the adhesive layer 51, spread on the liner by the spreader 16 from the drop of adhesive 50 deposited by the dropper 14. A punch similar to that shown in the aforesaid Johnson patent may be employed. The crowns with the spot liners positioned thereon are carried beneath the heater 19 and then into the pressure dial 20. The latter comprises a rotary table 60 and a plurality of vertically disposed pressure plungers 61 urged downwardly by compression springs 62 and lifted by cam rollers 63 riding on a circular cam track 64. The plungers 61 subject the assemblies to pressure during a single rotation of the table 60, for a sufficient length of time to firmly bond the spot to the cushion liners.

Referring to Figures 2 to 6 inclusive, the previously assembled shell 10 and cushion 11 is shown in Figure 2, in condition ready to receive a small body of adhesive from the adhesive applicator 14. As shown in Figure 3, the closure has received the body adhesive 50, and in Figure 4, the same has been spread out into a circular layer 51 by the spreader 16. Figure 5 shows the spot 52 after it has been positioned in place by the cutting punch 18. It should be noted that the margin 53 of the spot 52 projects outwardly a slight distance beyond the corresponding concentric margin of the adhesive layer 50. In Figure 6, the assembly has been subjected to the pressure of the plunger 61 in the dial 20 and the adhesive 51 has been squeezed outwardly, so that its margin coincides with the margin of the spot.

As stated above, the step of positioning the spot upon the adhesive layer need not immediately follow the application of the adhesive to the cork. On the contrary, the closures may be coated with the circular layers of adhesive and stored for an indefinite period of time, prior to the application of the spot liners. In such a case it is only necessary to reheat the adhesive layers in order to receive the liners.

It must be understood that the invention is not limited to the details of construction of the apparatus shown in the accompanying drawing and described above, nor to the particular method steps described, but covers all modifications coming within the scope of the appended claims and their equivalents.

We claim:

1. The method of securing spot liners to the cushions of crown closures, which comprises heating the crown shells and the cushions therein, positioning a small body of hot, tacky, thermoplastic adhesive substantially centrally of the cushion, subjecting the small body of adhesive so positioned to pressure between the cushion and a substantially plane spreading surface disposed in parallel relation thereto, thereby causing the adhesive to flow laterally between the cushion and said surface and to spread laterally on the surface of the cushion, and positively confining by obstruction the extent of lateral flow, thereby providing a coating of thermoplastic adhesive of definite size and position on the face of the cushion, depositing a spot liner concentrically on said layer of adhesive and subjecting the assembly to heat and pressure to secure the spot liner to the cushion when the adhesive cools.

2. The method of securing spot liners to the cushions of crown closures, which comprises depositing a body of hot, thermoplastic adhesive on the face of the cushion, subjecting the small body of adhesive so deposited to pressure between the face of the cushion and a plane spreading surface disposed in parallel relation to said face and moved relatively toward the same, thereby causing the adhesive to flow laterally and to spread over a portion of the face of the cushion, positively limiting by obstruction the extent of lateral flow thereof, thereby providing a layer of adhesive having definitely predetermined margins, placing a spot liner upon said layer of adhesive with its margins concentric to the margins of the layer, and subjecting the assembly to heat and pressure to secure the liner to the cushion when the adhesive cools.

3. The method of securing spot liners to the cushions of crown closures which comprises depositing a body of hot, thermoplastic adhesive on the face of the cushion, spreading the adhesive laterally over a portion of the face of the cushion and positively limiting by obstruction the extent of lateral flow thereof, thereby providing a layer of adhesive having definitely predetermined margins, placing a spot liner upon said layer of adhesive with its margins concentric to the margins of the layer and projecting outwardly therebeyond, and compressing the spot liner upon the layer of adhesive, thereby causing the layer of adhesive to flow laterally to the edges of the liner to secure the same to the cushion over its entire area.

4. The method of securing spot liners to the cushions of crown closures which comprises depositing a body of hot, thermoplastic adhesive on the face of the cushion spreading the adhesive laterally over a portion of said face by mechanical pressure applied thereto while simultaneously positively limiting by obstruction the extent of lateral flow, thereby providing a layer of adhesive having definitely predetermined margins, applying a spot liner to said layer of adhesive with its edges concentric to said margins, subjecting the crown closure, the layer of adhesive and the spot liner to heat, and then pressing the liner upon the layer of adhesive to bond the same to the cushion.

5. The method of securing spot liners to the cushions of crown closures which comprises preheating the crown shells and the cushions positioned therein, depositing a small body of hot, thermoplastic adhesive on the exposed surface of the cushion substantially at the center thereof, compressing the adhesive between the surface of the cushion and a member movable toward the cushion and thereby spreading the adhesive radially from said center, positively restraining by obstruction the radial spread of the adhesive along a circular line concentric to and spaced inwardly from the circular margin of the cushion, positioning a circular disc of spot lining material on said layer of adhesive with its margin concentric to the layer and cushion, and subjecting the assembly to pressure to adhesively unite the spot firmly to the cushion liner.

6. The method of securing a spot liner to the exposed surface of the resilient cushion of a crown closure which comprises positioning a small body of thermoplastic adhesives on said surface substantially at the center thereof, disposing a circular barrier wall in engagement with the surface of the cushion in concentric relation to the margin thereof, subjecting the body of thermoplastic adhesive to pressure between the surface of the cushion and a substantially plane spreading surface and thereby spreading the same radially between said surfaces from said center into contact with said circular barrier wall, and restraining the further outward spread of the adhesive by said wall, whereby a layer of thermoplastic adhesive is disposed concentrically of the cushion, removing said barrier wall, and then securing a spot liner to said cushion under the influences of heat and pressure and subsequent cooling of the adhesive.

7. In the manufacture of spot caps, the method of applying to the cushion in the crown shell a layer of thermoplastic adhesive material, which comprises depositing a small body of thermoplastic adhesive on the cushion substantially at the center thereof, then positioning an annular wall against the surface of the cushion along a circular line spaced from and concentric with the margin thereof, applying mechanical pressure to the previously deposited body of adhesive and thereby causing the same to flow and spread radially outwardly from the center against said wall, and limiting the outward spread of said adhesive by said wall, whereby the margins of the layer of adhesive are substantially concentric with the margins of the cushion.

8. An apparatus for securing spot liners to the cushions of crown closures, comprising means for depositing small bodies of hot, thermoplastic adhesive substantially centrally of the surface of the cushions, means for compressing and spreading the bodies of adhesive over the central portion of the cushions, said means comprising a plunger having a concave end face marginally defined by a circular edge engageable with the cushions on a circular line concentric to the circular edge thereof to limit the outward spread of the adhesive under the pressure of the plunger, means for depositing spots of sheet material concentrically upon the adhesive layers, and means for subjecting the assemblies to heat and to pressure to adhesively unite the spots firmly to the cushions when the adhesive cools.

9. An apparatus for coating the central portion of the exposed surface of a cushion disc in a crown closure with a layer of thermoplastic adhesive, comprising a die adapted to spread over said surface a previously deposited small body of tacky thermoplastic adhesive, said die being mounted for movement coaxially with respect to the cushion, and means for moving the die toward the cushion, said die having a downwardly projecting wall adapted to engage the surface of the cushion and to be embedded therein along a circular line concentric to the margin of the cushion, said die having a spreading surface adapted to compress the body of thermoplastic adhesive and to force the same outwardly against said downwardly projecting wall.

10. Apparatus for coating the central portion of the exposed surface of a cushion disc in a crown closure with a layer of adhesive, comprising means for accurately positioning such a closure, a plunger having an imperforate end face mounted for movement toward the closure, and means for moving the plunger toward the closure to engage the surface of the cushion in coaxial relation, said plunger having a circular concavity in its end face marginally defined by an edge projecting toward and engageable with the cushion along a circular line spaced in concentric relation inwardly of the edge of the cushion, said edge serving to limit the outward spread of a small body of adhesive previously applied centrally to the exposed surface of the cushion and compressed upon the cushion by pressure applied by said end face of said plunger.

11. Apparatus for coating the central portion of the exposed surface of a cushion disc in a crown closure with a layer of thermoplastic adhesive, comprising means for positioning a small, hot body of such adhesive substantially centrally of said surface, a plunger mounted for movement toward the closure, means for moving the plunger to engage the surface of the cushion in coaxial relation, and means for heating the plunger, said plunger having an end face bounded by a thin marginal projection extending toward and engageable with the cushion along a circular line spaced in concentric relation inwardly of the edge of the cushion, said edge serving to limit the outward spread of said body of adhesive when compressed upon the cushion by pressure applied thereto by the end face of the plunger.

12. An apparatus for applying center spot liners to crown closures, comprising means for conveying a line of closures step by step through the apparatus, means for heating the metal shells and the cushion liners as they enter the apparatus, means for depositing small bodies of hot, thermoplastic adhesive substantially centrally of the exposed surfaces of the cushion liners, means for spreading the bodies of thermoplastic adhesive over a central portion of the cushions and for positively limiting the extent of such spreading, means for depositing center spot liners upon the adhesive in concentric relation thereto, and to the cushion liners, means for heating the closures, the adhesive and the spot liners, and means for subjecting the heated assemblies to sufficient pressure to firmly bond the spot liners to the cushion liners.

13. Apparatus for securing a spot liner to a crown closure, comprising means for depositing a body of heated thermoplastic adhesive of predetermined volume substantially centrally of the cushion liner in the closure, means for spreading the body of adhesive radially over a central portion of predetermined diameter on said cushion and for definitely limiting the spreading of the adhesive to form a layer of less diameter than the spot liner to be applied thereto, means for placing a spot liner of larger diameter than said adhesive thereon in concentric relation therewith, and means for compressing the spot liner upon said adhesive with sufficient force to cause said adhesive to flow outwardly until its margins coincide with the margins of the spot liner.

FRANK J. GAVIN.
SCOTT IRA WILBUR.
ROBERT HOLLAND.